Patented Apr. 6, 1937

2,076,444

UNITED STATES PATENT OFFICE 2,076,444

GREASING UNIT

Swithin W. Buckley, Wilmington, Del.

Application July 11, 1936, Serial No. 90,229

15 Claims. (Cl. 184—27)

The invention relates to a unit constructed for the automatic greasing of all moving parts of either steam engines, internal combustion engines, Diesel and gas engines of all types, locomotives, aeroplanes, airships, vessels and ships, submarines, trucks, buses and stationary machinery of all types required in mills and shops; and the objects of the improvement are, first, to provide a constantly proportioned lubrication for any and all moving parts of machinery of every description; second, to afford facilities for the proper adjustment of the quantity of heavy oils or grease, leaving the greasing unit independent of the amount of grease retained in the reservoir; and, third, to supply the grease to the desired points under pressure without undue waste.

Figure 1:
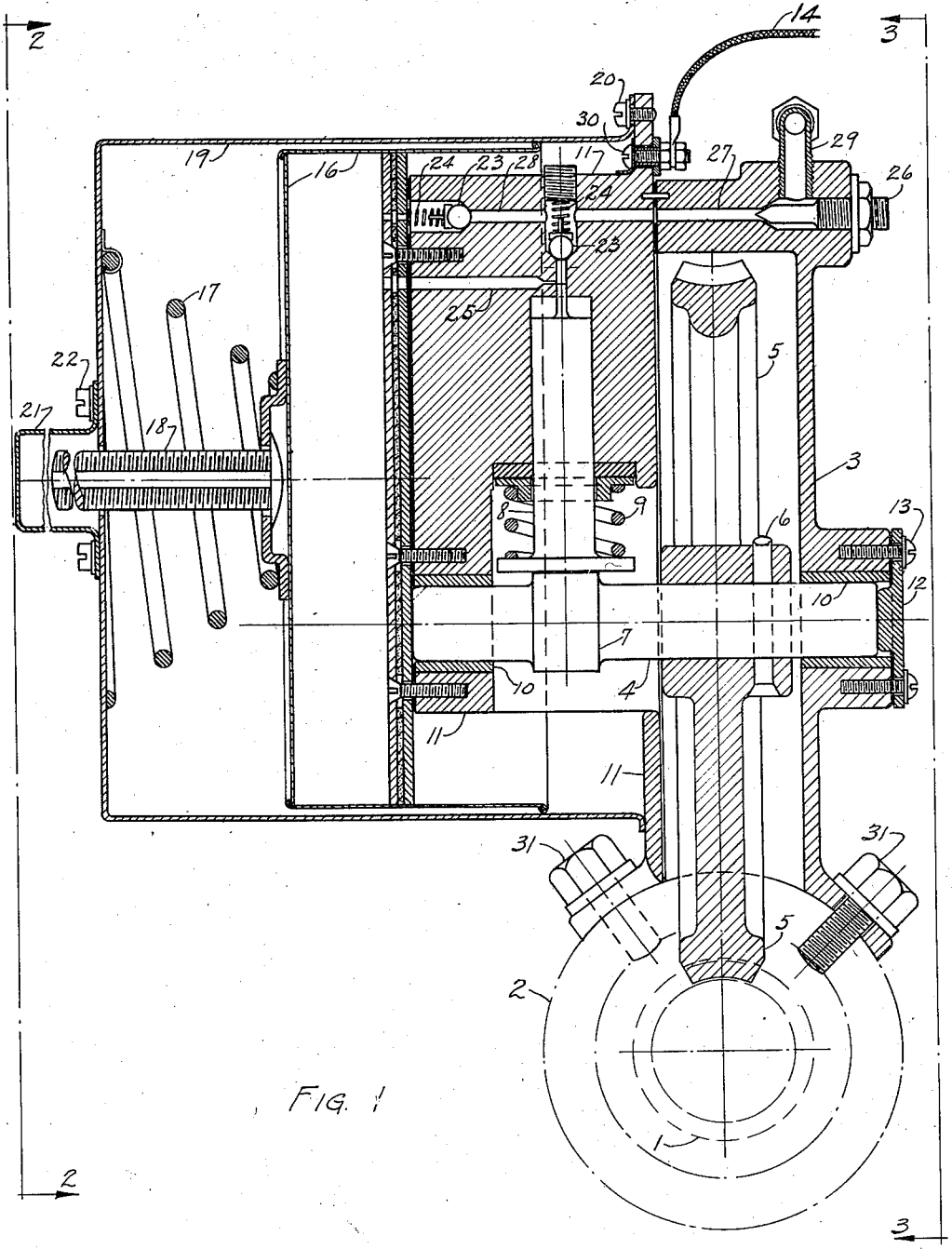
Figure 2:
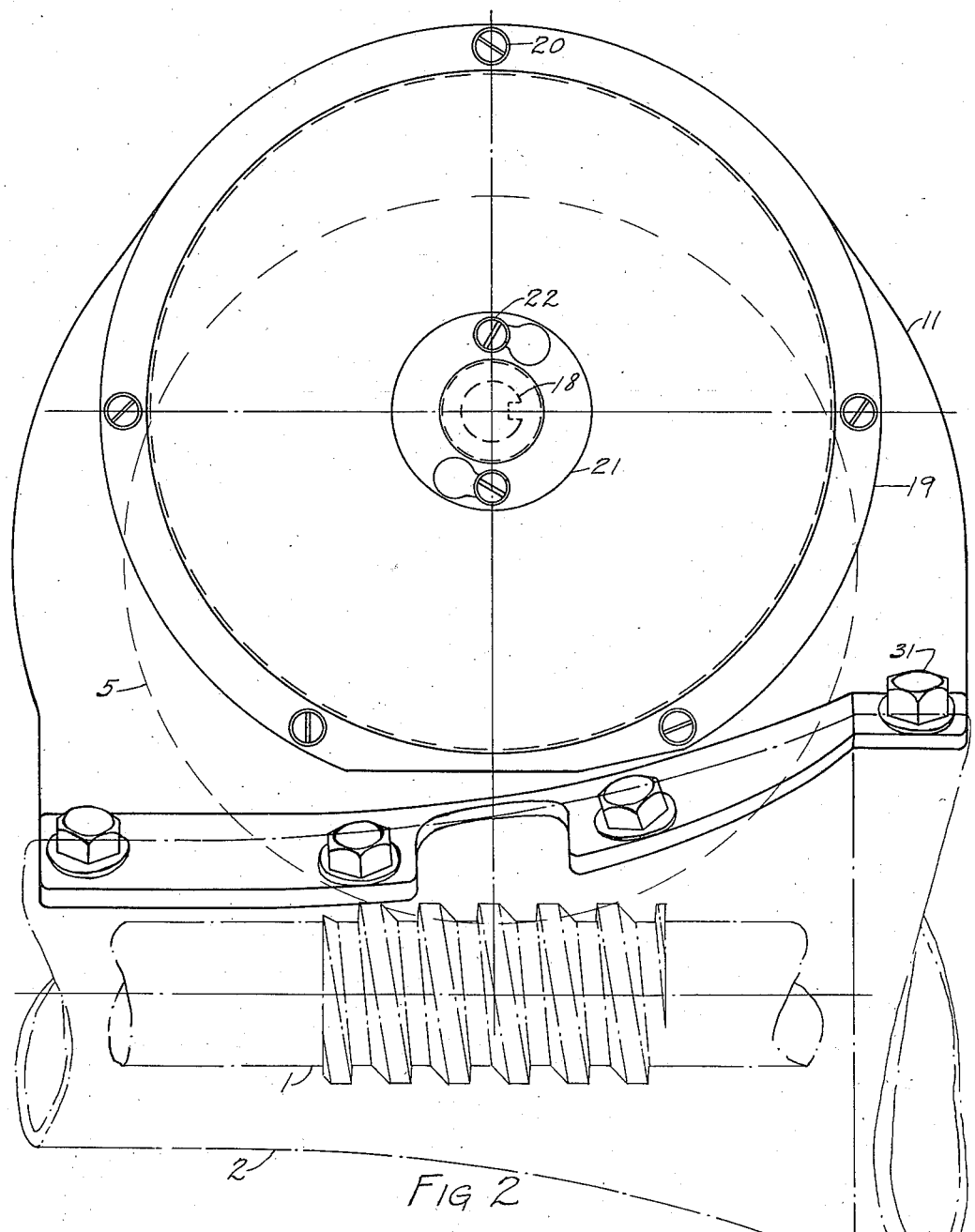
Figure 3:
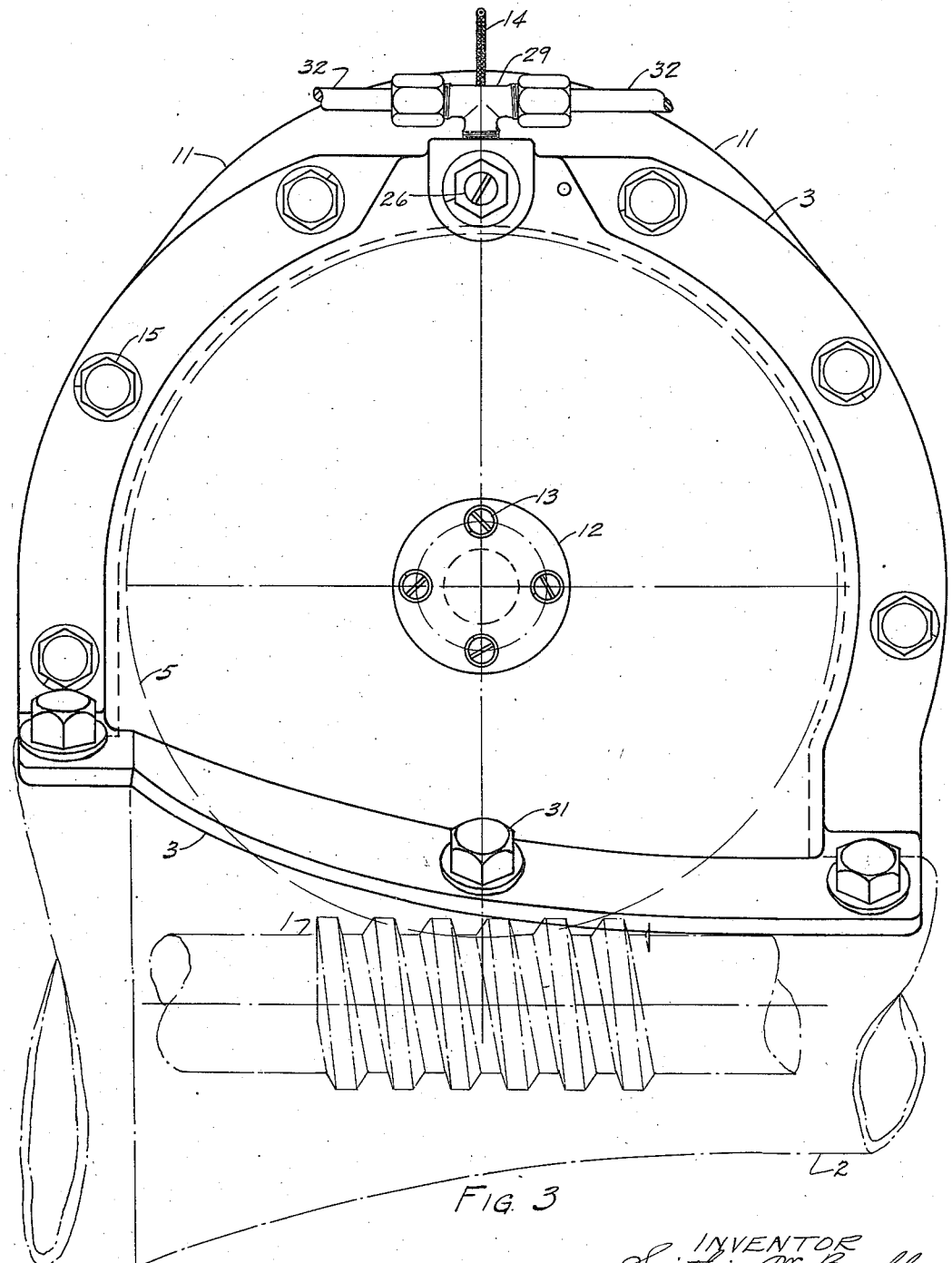

One form of the invention is illustrated in the accompanying drawings, in which Figure 1 is a vertical section of the entire unit; Figure 2 is an outside end view; Figure 3 is an outside view of the opposite end and in this case the drive of the unit is taken from the rear axle of an automobile of either a pleasure car or truck types.

The shaft and worm gear 1 is the driving unit and, 2, its housing, is not supplied with the greaser. Housings 3 and 11 are formed to conform to the details of the type machine of which it may become a part and set or attached on to and are held in place and attached to housing 2 by cap screws 31. Shaft 4 is rotated by worm gear 5, held to shaft 4 by pin 6. Nosed cam 7 forces plunger 8 up. Plunger 8 is returned to the lower position by spring 9, completing the cycle. Shaft bearings 10 are pressed into cases 3 and 11, and reamed to the proper diameter. Shaft 4 maintains its position by cap 12, held in place with screws 13. Case 11 is machined to receive various size plungers, in accordance with the capacity of the unit desired. Case 3 is held to case 11 by cap screws 15. Can 16 is grease reservoir, kept in position with spring 17, which also acts as pressure regulator for grease in reservoir. Can 16 is removable when suitable crank is placed on screw 18. Housing 19 is secured to case 11 by screws 20. Housing 21 is held to housing 19 with screws 22.

By removing the housing 21 a crank or the like can be placed in engagement with the projecting end of screw 18 and by rotating the same while in engagement with the screw, said screw can be drawn outwardly, pulling with it the inner convolutions of the spring 17 and relieving the can or reservoir 16 from pressure. While spring 17 is thus held under compression, the screws 20 used for fastening housing 19 in place are also relieved from pressure and can be turned easily for the purpose of releasing the housing. Thus the housing can be removed readily, the can or reservoir 16 detached, a new can or reservoir filled with lubricant replaced on the unit, housing 19 restored to its former position and fastened by the screws 20, and springs 17 then relieved from compression. Housing 21 can then be replaced and the parts are ready for further use, it being understood of course that the crank or other device used for actuating the screw is first removed. Consequently the recharging of the unit can be effected without disturbing any of the mechanism.

Balls 23 and 23' and springs 24 and 24' act as pressure check valves.

Grease is fed to the top of plunger by pressure of spring 17, through passage 25. Plunger forces grease past check valve and into passage 27. Adjustable screw 26 governs the quantity of grease permitted to flow from the unit, through T 29. Surplus grease passes back into reservoir through check valve by passage 28.

The grease is conducted from the automatic greasing unit to points of utilization by tubes 32.

When grease in reservoir 16 has become exhausted, contact between screw head 30 and case 19 is completed. Wire 14 is the grounded return of some form of electrical warning signal, placed conveniently for the attraction of operators.

Figures 1, 2 and 3 show the smaller type of automatic greaser. Units of larger capacities may be required to be self-contained and driven, resting on a common bed plate and be an individual unit or part from the main or auxiliary machinery which it is serving.

I claim:

1. A lubricating unit including a stationary structure constituting means for extending into the open end of a can of lubricant, a pump, means for subjecting said can of lubricant to a continuous external pressure to shift it relative to the structure on which it is mounted and feed its contents to the pump, and means operated by the mechanism being lubricated, for actuating the pump at a speed changeable in proportion to the speed changes of said mechanism.

2. A lubricating unit including a stationary structure constituting means for extending into the open end of a can of lubricant, a pump in said structure having an outlet to the mechanism to be lubricated, means for subjecting said can of lubricant to a continuous external pressure to shift it relative to the structure on which it is mounted and to feed its contents to the pump, and means operated by the mechanism being lubricated, for actuating the pump at a speed proportioned to the speed of said mechanism.

3. A lubricating unit including a pump having an inlet, there being an outlet from the pump for directing lubricant to mechanism to be lubricated, a lubricant container slidable on the pump, yielding means for subjecting the container to constant external pressure, thereby to expel its contents into the pump inlet, and means operated by the mechanism being lubricated, for actuating the pump at a speed dependent upon the speed of said mechanism, thereby to eject the lubricant through the outlet to said mechanism.

4. A lubricating unit including a pump, said pump having an inlet and an outlet, a mechanism for operating the pump and for receiving lubricant from the outlet, means operated by said mechanism for driving the pump at a speed dependent upon the speed of said mechanism, a lubricant container slidable relative to the pump and opening into the inlet, and means for subjecting the container to constant external pressure to expel its contents into the inlet and thence to the pump.

5. A lubricating unit including a case constituting means for extending into the open end of a can of lubricant, a pump mounted in the case having an inlet and an outlet for lubricant, mechanism for driving the pump at a speed proportionate to the speed of said mechanism, said outlet constituting means for supplying lubricant to said mechanism, a housing surrounding the case and can, and yielding means engaging the housing for exerting a constant external pressure upon the can and its contents, thereby to gradually expel the contents through the inlet to the pump.

6. The combination with driving mechanism, of means for supplying a lubricant thereto, including a stationary structure constituting means for extending into the open end of a can of lubricant, a pump, said pump having an inlet for receiving lubricant from the can, and an outlet, means operated by said mechanism for driving the pump at a speed dependent upon the speed of the mechanism, means for subjecting the can to constant external yielding pressure for expelling lubricant from its open end into the inlet and pump, and adjustable means for controlling the flow of lubricant through the outlet.

7. The combination with a mechanism to be lubricated, of a lubricating unit including a stationary structure constituting means for extending into the open end of a can of lubricant, a pump having an outlet leading to said mechanism, said structure having an inlet leading to the pump, means for subjecting the can on said structure to constant external yielding pressure thereby to expel its contents through the inlet to the pump, and means operated by said mechanism for actuating the pump at a speed constantly proportioned to the speed of the mechanism.

8. The combination with a mechanism to be lubricated, of a lubricating unit including a stationary structure constituting means for extending into the open end of a can of lubricant, a pump having an inlet for receiving lubricant from the open end of the can and a lubricant outlet, said outlet constituting means for directing lubricant to the mechanism, means operated by said mechanism for driving the pump at a speed constantly proportioned to the speed of the mechanism, means for subjecting the can to external pressure for shifting it along said structure and expelling lubricant through the inlet to the pump, and valved means for returning surplus lubricant from the outlet to the can.

9. The combination with a mechanism to be lubricated, of a lubricating unit including a case constituting means for extending into the open end of a can of lubricant, a pump within the case having an outlet leading to said mechanism and an inlet for receiving lubricant from the can, means actuated by said mechanism for driving the pump at a speed which is increased or reduced in proportion to the increase or reduction of speed of said mechanism, and means for exerting external yielding pressure upon the can for shifting it along the case and expelling lubricant therefrom through the inlet to the pump.

10. The combination with a mechanism to be lubricated, of a lubricating unit including a case constituting means for extending into the open end of a can of lubricant, a pump within the case having an outlet leading to said mechanism and an inlet for receiving lubricant from the can, means actuated by said mechanism for driving the pump at a speed which is increased or reduced in proportion to the increase or reduction of speed of said mechanism, means for exerting yielding pressure upon the can for shifting it along the case and expelling lubricant therefrom through the inlet to the pump, there being a passage leading from the outlet for returning to the can while under pressure, the surplus lubricant expelled by the pump, and valved means for preventing the flow of lubricant from the can into the return passage.

11. The combination with a mechanism to be lubricated, of a lubricant unit including a case constituting means for extending into the open end of a can of lubricant, a pump within the case having an outlet leading to said mechanism and an inlet for receiving lubricant from the can, means actuated by said mechanism for driving the pump at a speed which is increased or reduced in proportion to the increase or reduction of speed of said mechanism, means for exerting yielding pressure upon the can for shifting it along the case and expelling lubricant therefrom through the inlet to the pump, means within the outlet for controlling the flow of lubricant therethrough, said means being adjustable, and valved means for permitting return of surplus lubricant from the outlet to the lubricant can.

12. A lubricating unit including a case constituting means for extending into the open end of a can of lubricant, a pump therein having an inlet for receiving lubricant from the can and also having an outlet, means for actuating the pump, a lubricant can slidable on the case and opening into the inlet, a housing for enclosing the can, fastening means for holding the housing detachably connected to the case, a spring within and thrusting against the housing for binding the housing to its fastening means and for exerting normally a constant yielding pressure against the can in the housing to shift said can and expel lubricant through the inlet to the pump, and means carried by the housing for holding the spring against expansion to relieve the can from the action of the spring and relieve the housing from pressure on its fastening means, thereby to permit removal of the housing and can without expulsion of the contents of the can.

13. A lubricating unit including a case proportioned to extend into and support a can of lubricant, a pump therein having a lubricant inlet and outlet, means for actuating the pump, and means for subjecting the can to constant pressure to feed it along the case and to expel the contents thereof through the inlet to the pump, and valved means in the case for releasing surplus lubricant from the outlet back to the can.

14. A lubricating unit including a case proportioned to extend into and support a can of lubricant, a housing detachably connected to and surrounding the case, a spring within the housing for exerting a constant pressure against a can of lubricant and feeding it within the housing and along the case, a pump in the case having an inlet for receiving lubricant from said can and an outlet for the lubricant, and a signal circuit adapted to be closed by the can when moved to a predetermined position on the case.

15. A lubricating unit including a case proportioned to extend into and support a can of lubricant, a housing detachably connected to and surrounding the case, a spring within the housing for exerting a constant pressure against a can of lubricant and feeding it within the housing and along the case, a pump in the case having an inlet for receiving lubricant from said can and an outlet for the lubricant, there being a passage in the case leading from the outlet back to the can for the return of excess lubricant within the outlet, and valves within the outlet and the return passage respectively.

SWITHIN W. BUCKLEY.